United States Patent
Chen et al.

(10) Patent No.: US 10,546,368 B2
(45) Date of Patent: Jan. 28, 2020

(54) METHOD AND DEVICE FOR COMPENSATING THE PERCEPTUAL BIAS OF EDGE BOOST IN A DISPLAY PANEL

(71) Applicant: Solomon Systech (Shenzhen) Limited, Shenzhen (CN)

(72) Inventors: Jun Chen, Hong Kong (HK); Xiacong Liu, Hong Kong (HK); Sing Ng, Hong Kong (HK); Wing Chi Stephen Chan, Hong Kong (HK); Cheung Fai Lee, Hong Kong (HK)

(73) Assignee: Solomon Systech (Shenzhen) Limited, Shenzhen (CN)

( * ) Notice: Subject to any disclaimer, the term of this patent is extended or adjusted under 35 U.S.C. 154(b) by 235 days.

(21) Appl. No.: 15/695,119

(22) Filed: Sep. 5, 2017

(65) Prior Publication Data

US 2019/0073754 A1    Mar. 7, 2019

(51) Int. Cl.
| | |
|---|---|
| *G06T 5/00* | (2006.01) |
| *G06T 5/20* | (2006.01) |
| *G06T 7/90* | (2017.01) |
| *H04N 1/60* | (2006.01) |
| *G06T 5/50* | (2006.01) |
| *H04N 5/14* | (2006.01) |

(52) U.S. Cl.
CPC ............... *G06T 5/002* (2013.01); *G06T 5/20* (2013.01); *G06T 5/50* (2013.01); *G06T 7/90* (2017.01); *H04N 1/6008* (2013.01); *H04N 5/142* (2013.01); *G06T 2207/10016* (2013.01); *G06T 2207/10024* (2013.01); *G06T 2207/20012* (2013.01); *G06T 2207/20192* (2013.01)

(58) Field of Classification Search
None
See application file for complete search history.

(56) References Cited

U.S. PATENT DOCUMENTS

| | | | | |
|---|---|---|---|---|
| 2006/0269125 | A1* | 11/2006 | Kalevo | G06T 5/009 382/162 |
| 2010/0111440 | A1* | 5/2010 | Chai | G06T 3/0018 382/275 |
| 2011/0019931 | A1* | 1/2011 | Hamada | H04N 5/7755 382/251 |

(Continued)

*Primary Examiner* — Kim Y Vu
*Assistant Examiner* — Nathan J Bloom
(74) *Attorney, Agent, or Firm* — Spruson & Ferguson (Hong Kong) Limited

(57) ABSTRACT

A method and a display driver for compensating the perceptual bias of edge boost when driving a display panel are provided. The method can pre-process an input image to compensate for a perceptual bias of edge boost, e.g., at a contiguous group of color bands in the input image prior to sending the input image in a form of plural frames to a display panel for display. The method includes the steps of partitioning an input image into one or more grayscale regions, segmenting the grayscale regions into a plurality of color bands, detecting a subtle but perceivably significant change of color or luminance between two adjacent color bands, identifying a transition region and performing color dilution on the transition region. The display driver can include an input buffer, an image processor configured to execute the above method and an output buffer.

21 Claims, 16 Drawing Sheets

(56) References Cited

U.S. PATENT DOCUMENTS

| | | | |
|---|---|---|---|
| 2013/0064445 A1* | 3/2013 | Eddy | G06T 5/002 382/162 |
| 2015/0334268 A1* | 11/2015 | Lebowsky | H04N 19/46 382/166 |
| 2016/0307298 A1* | 10/2016 | Chou | G06T 3/4007 |
| 2017/0111645 A1* | 4/2017 | Pettersson | H04N 19/70 |

* cited by examiner

METHOD AND DEVICE FOR COMPENSATING THE PERCEPTUAL BIAS OF EDGE BOOST IN A DISPLAY PANEL

FIELD OF THE INVENTION

The present disclosure generally relates to display technology, and more particularly relates to methods and devices for pre-processing an input image and compensating the perceptual bias of edge boost at a contiguous group of color bands in the input image for improving the visual performance of a display panel when displaying images with grayscale or gradual color changes therein.

BACKGROUND OF THE INVENTION

A display system, includes a microcontroller unit (MCU)/application processor (AP) for generating videos or images for display, a display driver integrated circuit (IC) with circuitry designed to provide output signals for controlling a display panel in accordance to the videos or images from the MCU, and a display panel with pixels arranged in rows and columns. When the display system displays video or image signals including grayscale patterns or other images with gradual color changes between two or more adjacent regions, a human's visual system has a tendency to accentuate or "boost the contrast of the intensity difference such that the edge can be identified.

As a result, the perceived brightness of a grayscale region in a video or image may appear jagged, particularly when the display panel has high resolution or high dynamic range. Therefore, there is a need for a display driver IC that can compensate for the perceptual bias of edge boost in a display panel for improving the visual performance.

SUMMARY OF THE INVENTION

In accordance with various embodiments of the present disclosure, methods for pre-processing an input image with a plurality of pixel data to compensate for a perceptual bias of edge boost at a contiguous group of color bands in the input image prior to sending the input image in a form of plural frames to a display panel for display is disclosed. In certain embodiments, the present disclosure provides a display driver, comprising an input buffer configured to receive an input image to be displayed, an image processor configured to execute a process of processing the input image and compensating the perceptual bias of edge boost therein and an output buffer configured to store the modified image for generating a plurality of control signals for driving the display panel.

In certain embodiments, in order to compensate the perceptual bias of edge boost, the method detects a perceivably significant color change or luminance change between two adjacent color bands in the contiguous group of color bands, identifies a transition region therein and optimizes the visual performance by performing color dilution or frame rate control at the transition region to form a modified image based on interpolation. In certain embodiment, the method further comprises the step of identifying an intermediate transition region from the aforesaid transition region to improve the smoothness of the transition between two adjacent color bands.

The details of one or more implementations of the present disclosure are set forth in the accompanying drawings and from the following detailed descriptions. Other features, structures, characteristics, and advantages of present disclosure will be apparent from the description and drawings, and from the claims.

BRIEF DESCRIPTION OF THE DRAWINGS

The accompanying figures, where like reference numerals refer to identical or functionally similar elements throughout the separate views and which together with the detailed description below are incorporated in and form part of the specification, serve to illustrate various embodiments and to explain various principles and advantages in accordance with a present embodiment.

Figure 1:
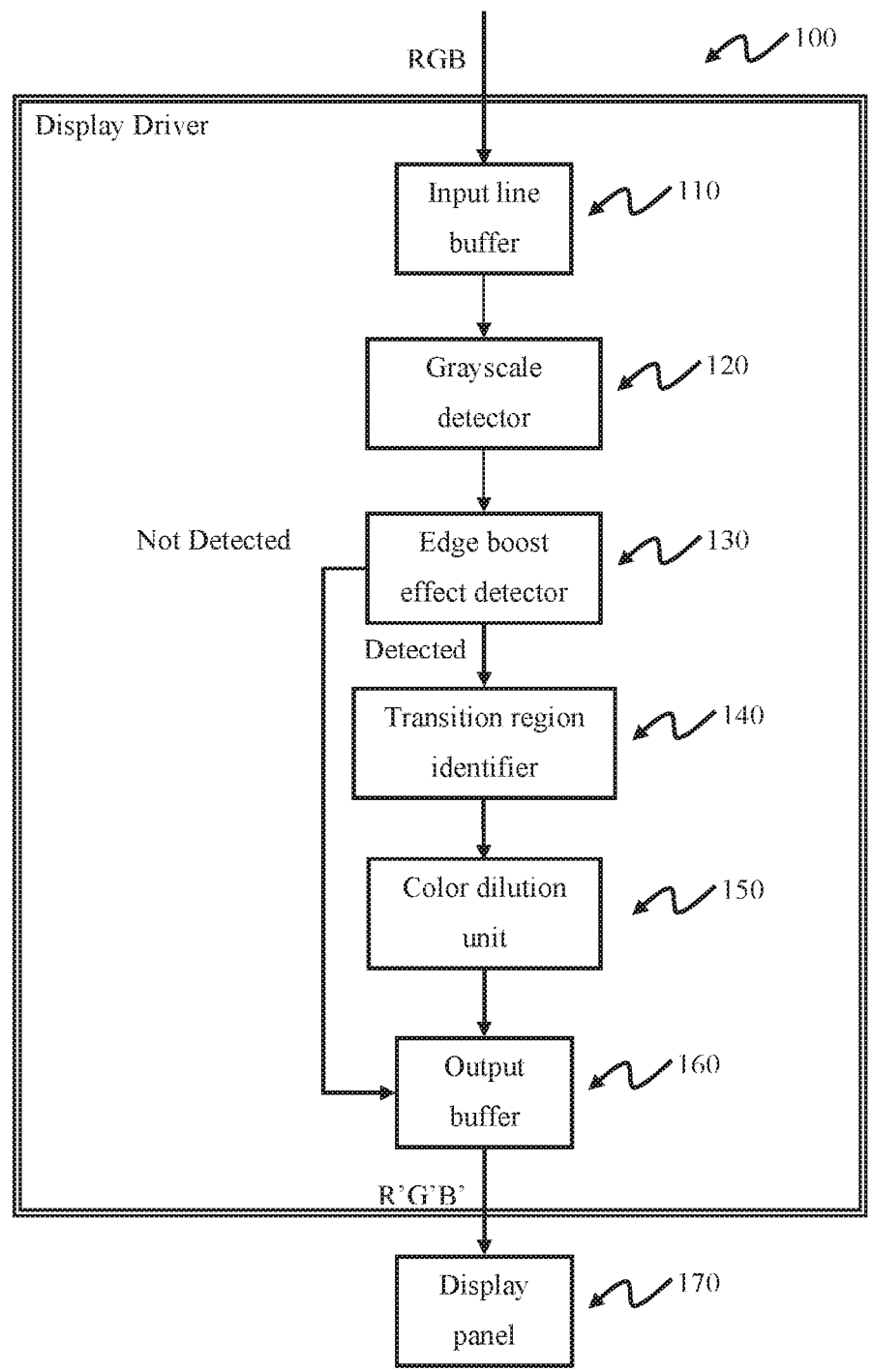
FIG. 1 depicts a block diagram showing, in outline, the overall structure of an apparatus for compensating the perceptual bias of edge boost according to an exemplary embodiment of the present disclosure.

Skilled artisans will appreciate that elements in the figures, particularly those conceptual diagrams, are illustrated for simplicity and clarity and have not necessarily been depicted to scale.

DETAILED DESCRIPTION

The following detailed description is merely exemplary in nature and is not intended to limit the disclosure or its application and/or uses. It should be appreciated that a vast number of variations exist. The detailed description will enable those of ordinary skilled in the art to implement an exemplary embodiment of the present disclosure without undue experimentation, and it is understood that various changes or modifications may be made in the function and arrangement of steps and method of operation described in the exemplary embodiment without departing from the scope of the present disclosure as set forth in the appended claims.

The present disclosure relates to any display panels with configurable pixels. The following terms are used herein in the specification and appended claims. The term "display panel" as used herein can be a liquid crystal display (LCD), an organic light emitting diode (OLED) display, a plasma panel display (PDP), a field emission display (FED), an electrophoretic display (EPD), flexible display or other display devices comprised of a plurality of pixels that are capable of displaying images and/or video.

The term "RGB color" as used herein represents a color definition of a pixel based on the three primary color components of the red, green, or blue, and denoted in the form of "(red, green, blue)" throughout the specification hereinafter. For example, in an 8-bit RGB color system, black color is represented by (0, 0, 0) and white color is represented by (255, 255, 255). When "at least one of the RGB color components" is referred to, the statement shall include "only red", "only green", "only blue", or any combination of red, green, and blue.

The term "grayscale region" as used herein can be an input image or a part therein with a contiguous group of color bands varying in color gradually from one end to another end.

The term "color band" as used herein is a group of pixel data contiguously connected in a grayscale region having the same RGB color. Thus, "the color of a color band" is referring to the RGB color of the pixel data in the color band.

The term "perceivably significant color change" as used herein is defined as a stepwise color change equivalent to or less than 1% of the full color depth in a grayscale pattern from one color band to an adjacent color band where the perceptual bias of edge boost is noticed and observable on a display panel by human eyes. By the experiments performed by the Inventors, the perceivably significant color change is not more than 2 grayscale levels for each color component in an 8-bit RGB color system. Thus the perceivably significant color change in an 8-bit RGB color system may be about 0.39%, or 0.78% of the full 256-level color depth. In systems with a higher color depth, for example: in a 9-bit or 10-bit RGB color system, the impact of the edge boost is similar and the perceptual bias is expected to be noticed and observable when there is a stepwise color change of 1% of the corresponding full color depth in a grayscale pattern. Thus the perceivably significant color change in a 9-bit RGB color system may be about 0.20%, 0.39%, 0.58%, 0.78%, or 0.98% of the full 512-level color depth. The perceivably significant color change in a 10-bit RGB color system may be about 0.10%, 0.20%, 0.29%, 0.39%, 0.49%, 0.58%, 0.68%, 0.78%, 0.88%, or 0.98% of the full 1024-level color depth.

Terms such as "longitudinal" and "lateral" as used herein define a consistent orientation with respect to the grayscale region, but do not necessarily require the pixel data arranging in longitudinal direction be on the longitudinal axis or the pixel data arranging in lateral direction be on the lateral axis. Also, the use of relational terms, such as, "adjacent", "first", "last" and the like are used to represent the orientation of a color band with respect to a grayscale pattern and are not intended to limit the scope of the invention or the appended claims.

The term "luminance intensity" when used in reference to a pixel data means the expected intensity of light emitted from the respective pixel on the display panel. Unless stated otherwise, the display driver estimates the luminance intensity of a pixel according to the respective color components of the pixel data. The luminance intensity of a pixel data can be determined by separating the color components of the pixel data into three primary colors and processing a summation of predefined percentages of the three primary colors of the pixel data. The luminance intensity can be estimated using the following equation:

$$\text{Luminance intensity of a pixel data} = \frac{R + 2G + B}{4} \quad (1)$$

where R, G, B are the colors of the three primary colors components of a pixel data.

The term "perceivably significant luminance change" as used herein is defined as stepwise color change equivalent to or less than 1% of the maximum luminance intensity as estimated using equation (1) or other similar equations with the same effect from one color band to an adjacent color band where the perceptual bias of edge boost is noticed and observable on a display panel by human eyes. In systems with a higher color depth, for example: in a 9-bit or 10-bit RGB color system, the impact of the edge boost is similar and the perceptual bias is expected to be noticed and observable when there is a stepwise color change of 1% percentage of the corresponding maximum luminance intensity in a grayscale pattern.

The methods described herein performed by the systems, devices, apparatus, subsystems, and modules are described serially. However, in all such cases, the block diagrams, flow charts and steps of these methods may be performed independently and in parallel, or by separated elements in conjunction or in parallel, whether synchronously or asynchronously, in a pipelined manner, or otherwise, except where it is necessary that such steps be performed serially, or where such necessity is explicitly so stated.

FIG. 1 illustrates a block diagram showing the overall structure of a display driver 100 configured to compensate the perceptual bias of edge boost at a contiguous group of color bands in the input image according to an exemplary embodiment of the present disclosure. The display driver 100 includes an input buffer 110, a grayscale detector 120, an edge boost effect detector 130, a transition region identifier 140, a color dilution unit 150 and an output buffer 160. The processed RGB (R'G'B') components of the pixel data in the input image are sent to a display panel 170 in a form of plural frames for display.

Figure 2:
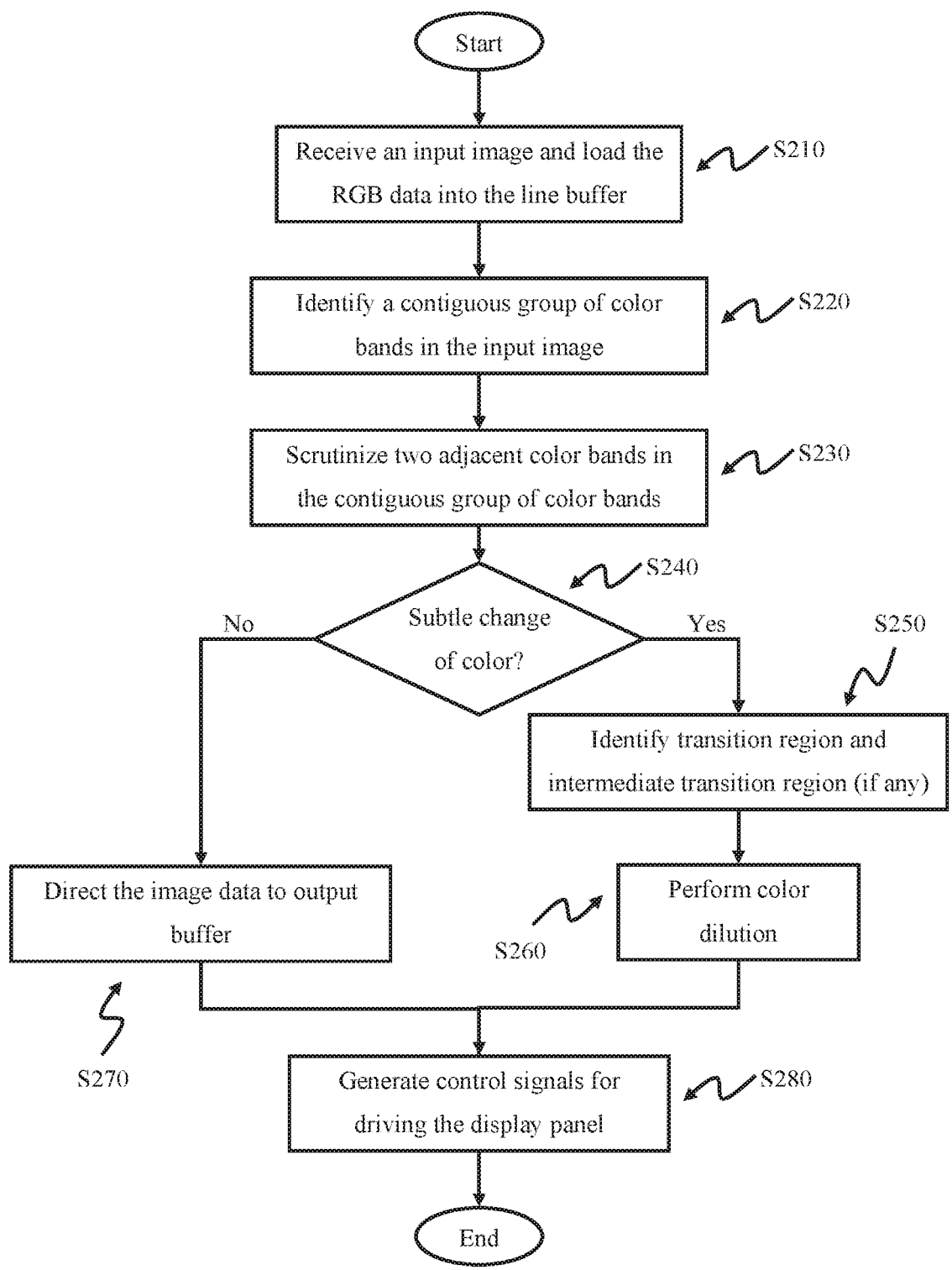
FIG. 2 depicts a flowchart of a driving method for compensating the perceptual bias of edge boost according to an exemplary embodiment of the present disclosure.

FIG. 2 illustrates a flowchart of a driving method executed by the display driver 100 for compensating the perceptual bias of edge boost according to an exemplary embodiment of the present invention.

The display driver 100 depicted in FIG. 1 is typically an integrated circuit device for controlling a display panel 170. It can be integrated with the display panel 170 or separated. When integrated in the display panel 170, it can be mounted at any position within or on a display glass, a printed circuit board, a chip on film (COF), a tape-automated bonding (TAB), a wafer-level packaging (WLP), various types of IC packaging, or other connecting media. The display driver 100 may include other circuit blocks for receiving and processing image or video data for display purposes. In one embodiment, the display driver 100 or any part therein may be encompassed within a microcontroller (MCU), a custom integrated circuit, a field-programmable gate array (FPGA), gate in panel (GIP) circuits, a computer programmed to perform a method, a programmable I/O device, other semiconductor devices, or a combination of any aforesaid device. The circuits of the display driver 100 can be formed at least partially by software programs, logic gates, analog circuit blocks, transistors, semiconductor devices, discrete components, other electronic devices, or a combination of any aforesaid circuit structures.

The input line buffer 110 is configured to receive an input image to be displayed on a display panel. The input line buffer 110 can also receive an input video in the form of consecutive images, generally referred to as frames, to be displayed sequentially at a frame rate. The input, video can be processed with a RGB, YUV, etc. standard at a frame rate of 24 fps or 30 fps, but in some cases the frame rate can be different to support specific purposes or standards. The term "input image" as used herein is used generally to represent the signal received by the input line buffer 110 and is not intended to exclude the use of video or other data formats/signals. The input image includes a plurality of pixel data arranged in a two-dimensional matrix of rows and columns according to the resolution of the display panel 170. Each pixel data includes a red (R) data, a green (G) data and a blue (B) data for indicating the intensity of each color component of the pixel data in the two-dimensional matrix. When each of the R, G, and B data is 8-bit, the color depth of the image is 24-bit. The R, G, and B data of the input image is transmitted to and loaded into the input line buffer 110, as illustrated in step S210, along a transmission line from a MCU, a signal generation device, a computer-readable medium, or a system block within the display driver 100, whether with or without memory. The transmission line can transmit the R, G, and B data in parallel, in series, or embedded in various types of communication protocols including, but not limited to, inter-integrated circuit (I$^2$C), low-voltage differential signaling (LVDS) and mobile industry processor interface (MIPI). The input line buffer 110 may also include memory circuits for holding the R, G, and B data for further processing.

The grayscale detector 120 can identify a contiguous group of color bands in the input image S220. In the input image as stored in the input line buffer 110, a grayscale region is represented by a plurality of pixel data arranged sequentially in the two-dimensional matrix with continuous and gradual changes of at least one of the R, G, and B color components. The gradual change is characterized by a subtle but perceivably significant change of a predefined number of grayscale levels. As an exemplary case, a grayscale region might have the first four rows with pixel data of (255, 128, 128), next four rows with pixel data of (255, 127, 127) and continuously decrease by 1 on both green and blue color components every four rows until the last four rows with pixel data of (255, 0, 0). In the above case, each four rows in the two-dimensional matrix have a plurality of pixel data contiguously connected having the same RGB color, and the group of pixel data forms a color band. Therefore it is apparent that the pixel data of the first color band in the contiguous group of color bands has the same RGB color components and different from the RGB color components of the pixel data in the second color band by a perceivably significant color change. The stepwise transition from the first color band to the last color band is characterized as a longitudinal direction with respect to the grayscale pattern.

Figure 3:
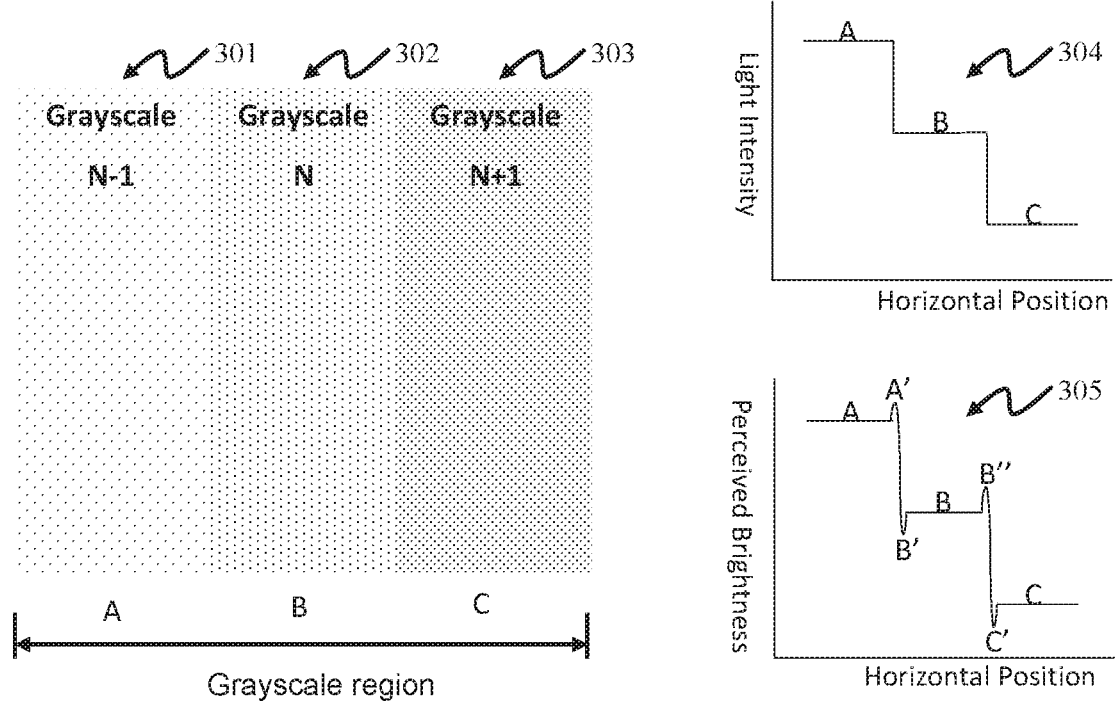
FIG. 3 depicts an input image as an example with a grayscale region comprising three color bands (A, B and C) for displaying on a display panel, and two corresponding graphs indicating the intensity levels provided by the display driver and the perceived brightness as observed from the display panel by human eyes.

The edge boost effect detector 130 can detect a perceivably significant color change by at most a certain number of grayscale levels in at least one of the RGB color components between two adjacent color bands in the contiguous group of color bands. From the experiments performed by the Inventors, the number of grayscale levels is not more than 1% of the full color depth in a gray scale pattern. As depicted in FIG. 3, when displaying an image of three horizontally arranged color bands A 301, B 302, and C 303, the perceived brightness 305 by human eyes visually is different from the light intensity 304 as delivered to the display panel 170. At the boundary between two adjacent color bands, the perceived brightness 305 of a color band is affected by the color adjacent to it. Therefore, the boundary at color band A 301 has a visual perception of a slightly brighter color A' and the boundary at color band B 302 adjacent to color band A 301 has a visual perception of a slightly darker color B'. In order to compensate for the above described perceptual bias of edge boost, the boundary between the two adjacent color bands is scrutinized S230 to detect any perceivably significant color change by at most a predefined number of grayscale levels S240. The number of grayscale levels, that may generate a perceptual bias of edge boost, depends on the color depth of the pixel data, the size and brightness sensitivity of the panel, and other panel related parameters. If a perceivably significant color change is detected between two adjacent color bands, the edge boost effect detector 130 can provide a signal to the transition region identifier 140 to indicate the edge between the two adjacent color bands for further optimization. In the event that perceivably significant color change is not detected, the pixel data of the two color bands are directed to the output buffer 160 for display directly S270.

Figure 5:
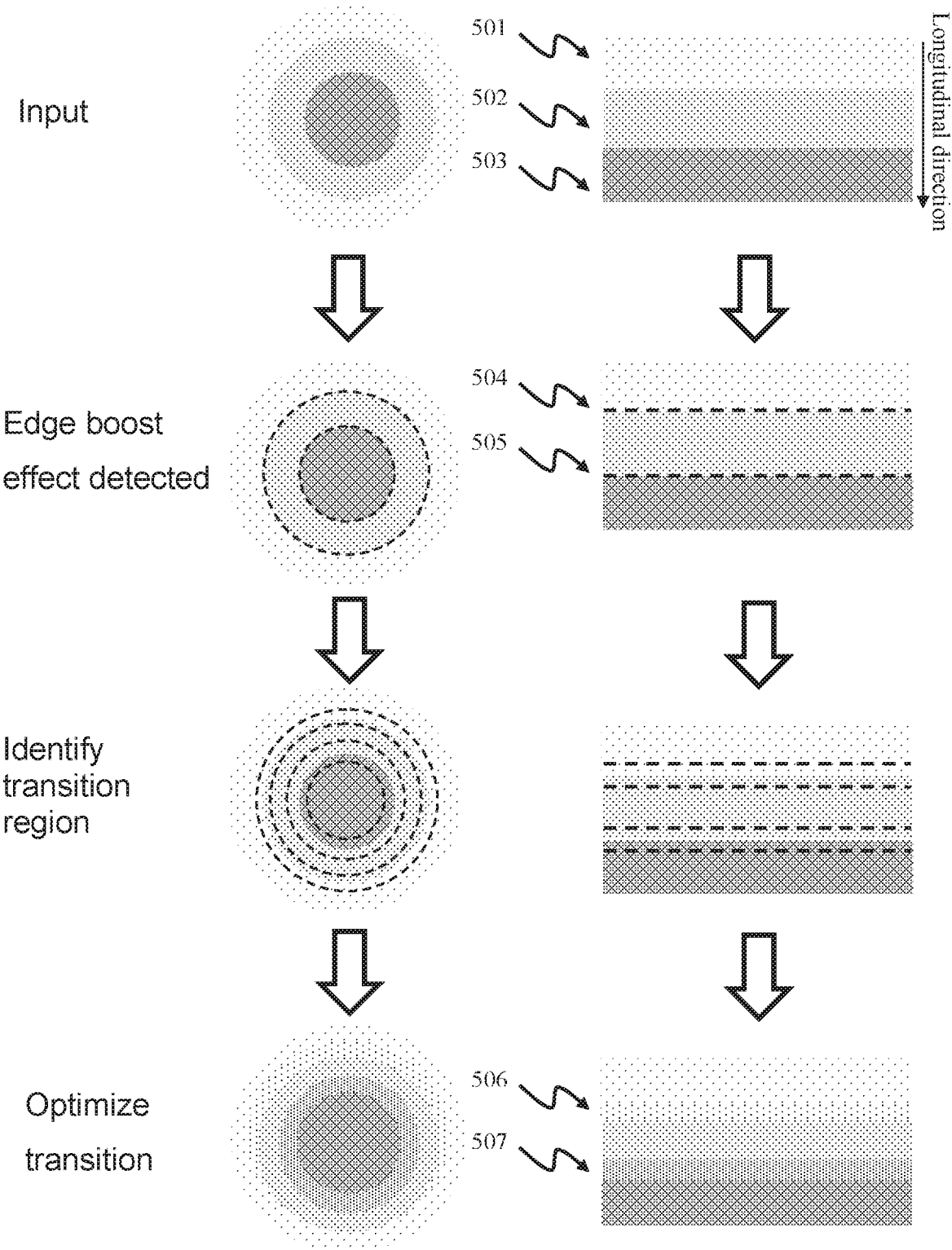
FIG. 5 depicts two input images and the respective conceptual diagrams explaining the detection of edge boost and the optimization of the transition regions, served as an example.

FIG. 5 illustrates two exemplary input images and conceptual diagrams explaining the detection of edge boost and the optimization of the transition regions.

Figure 7:
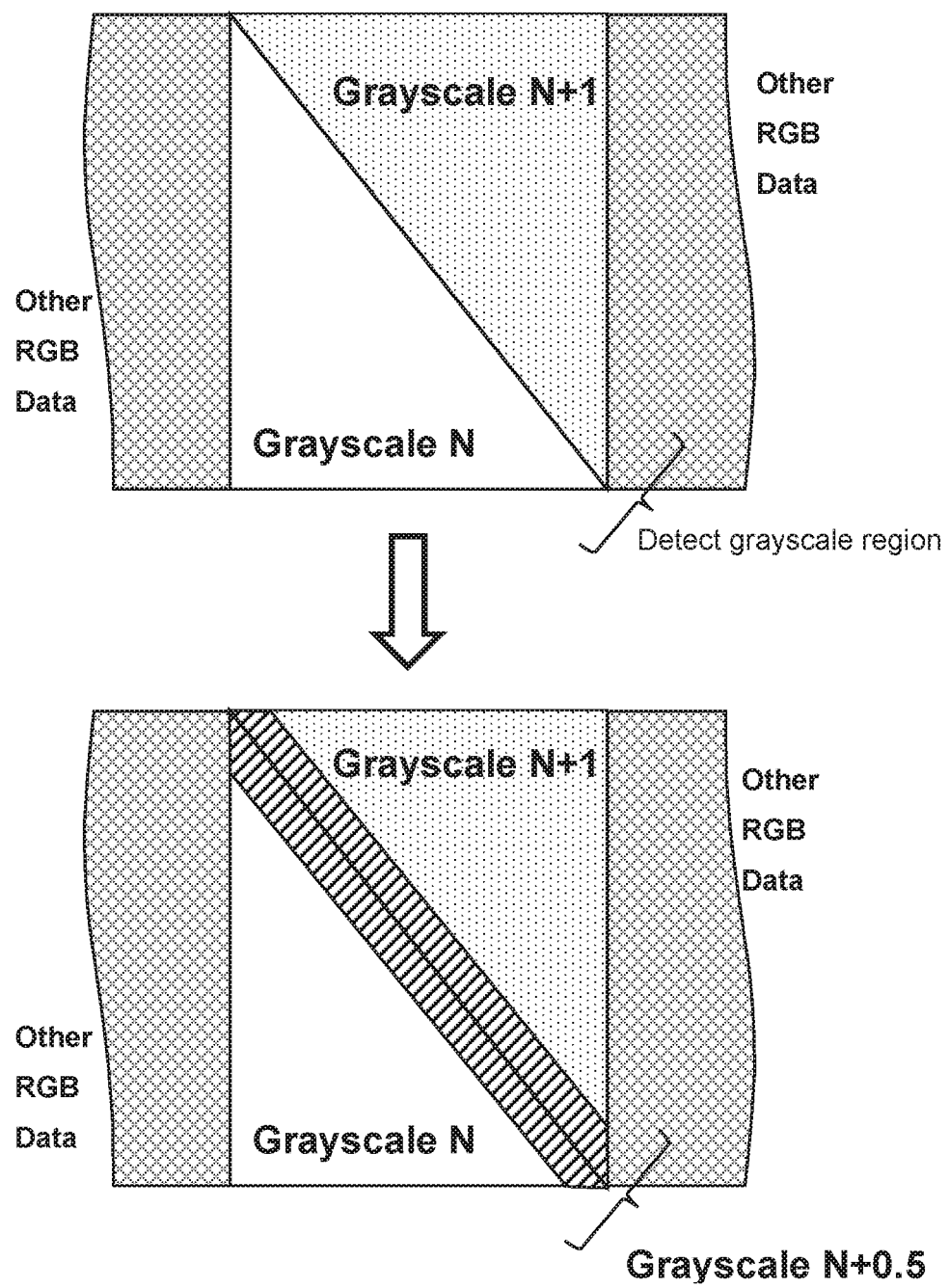
FIG. 7 depicts a conceptual diagram describing an embodiment of the edge boost compensating method of an image with color bands arranged diagonally.
Figure 15:
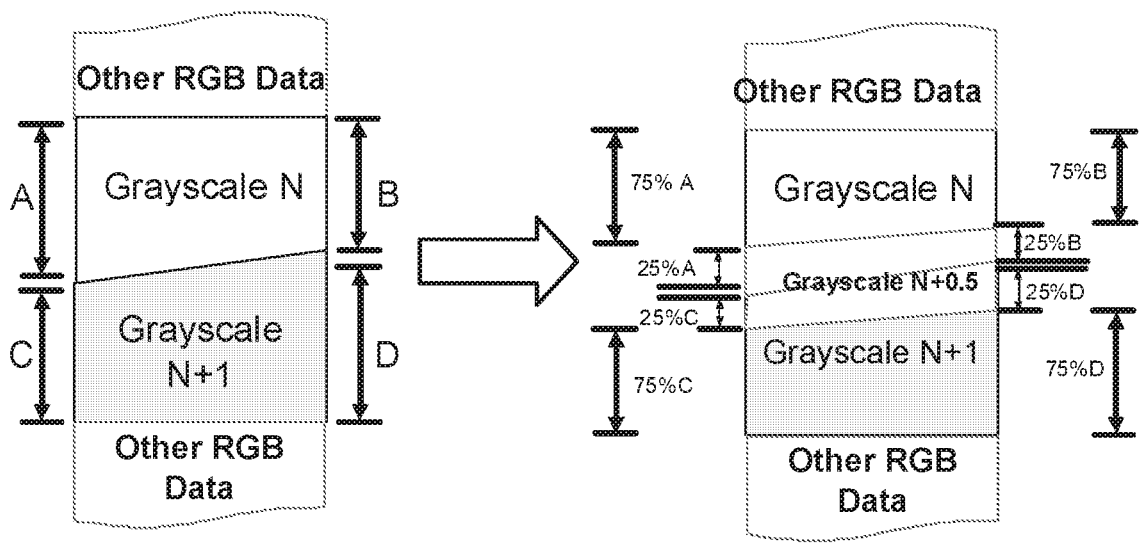
FIGS. 15 and 16 are conceptual diagrams describing two alternative methods to handle tilted color bands.
Figure 16:
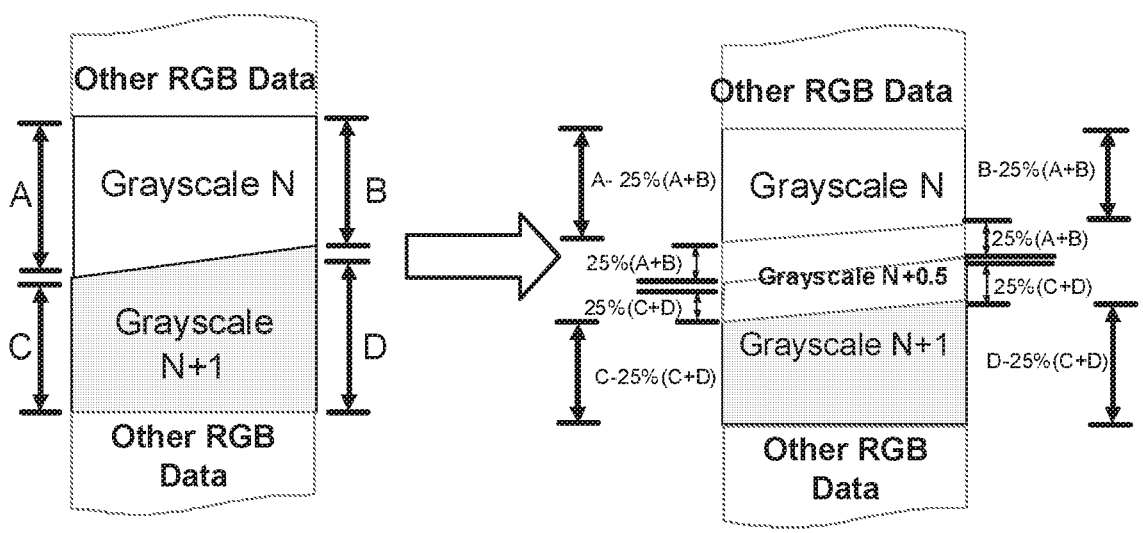

Referring to FIG. 5, the input image on the right has 3 color bands: 501, 502 and 503. The edge boost effect detector 130 operates to scrutinize two adjacent color bands for identifying areas with edge boost effect. When color bands 501 and 502 are compared, if a perceivably significant color change by a predefined number of grayscale levels is detected between color bands 501 and 502, for example color band 501 has a color of (160, 0, 160) and color band 502 has a color of (159, 0, 159), the edge boost effect detector 130 can provide a signal to the transition region identifier 140 to indicate the edge 504 for further optimization. Similarly, if color band 503 has a color of (158, 0, 158), then another edge 505 is identified for further optimization. The exemplary edge detection method as described above is based on a horizontally arranged grayscale pattern. It is apparent to those skilled in the art to apply the above method in a vertically arranged grayscale pattern, diagonally arranged grayscale pattern, or other grayscale patterns in an irregular shape. FIG. 7 depicts a conceptual diagram describing the case of a diagonally arranged gray scale pattern, while FIGS. 15 and 16 depict alternative methods for handling tilted color bands.

Figure 6:
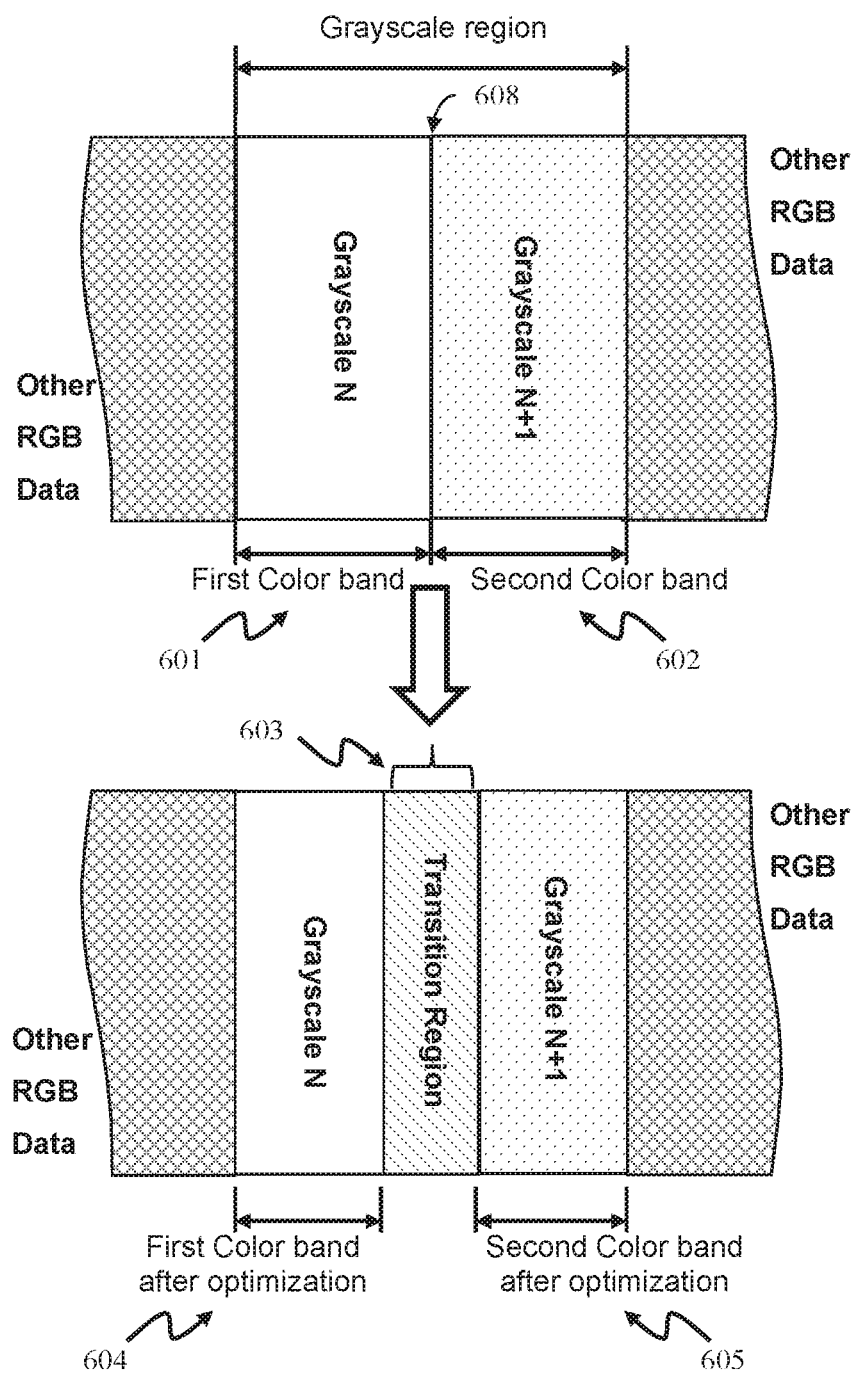
FIG. 6 depicts a conceptual diagram describing an embodiment of the edge boost compensating method.
Figure 9:
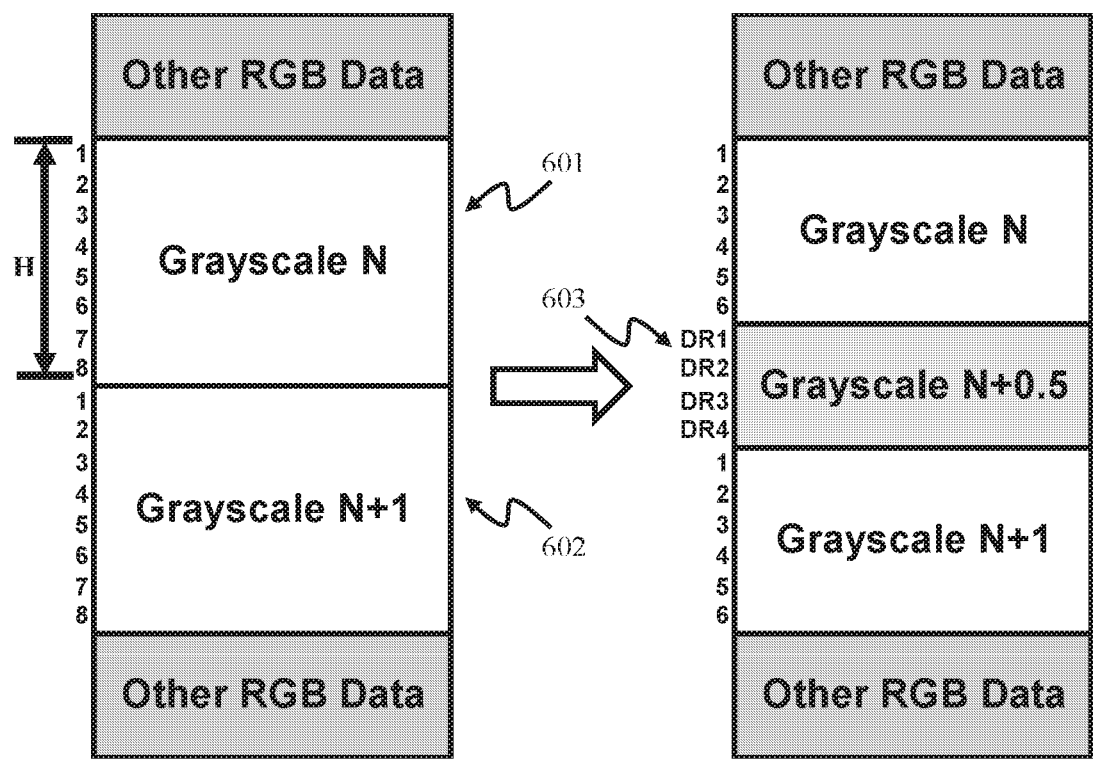
FIG. 9 depicts a conceptual diagram describing an embodiment of the edge boost compensating method when 4<H<=8.

The transition region identifier 140 can identify a transition region between the two adjacent color bands S250 where the perceivably significant color change is detected S240 by the edge boost effect detector 130. Now referring to FIG. 6, the diagram describes a method for identifying a transition region 603 from a first color band 601 and a second color band 602 in a grayscale region. The color of the first color band 601 in the contiguous group of color bands is different from the color in the second color band 602 adjacent to the first color band 601 by a perceivably significant color change. The transition region 603 can be formed at the edge 608 between the first color band 601 and the second color band 602, and a new grayscale level for the pixel data therein can be indicated accordingly. The new grayscale level is estimated based on the colors of the two adjacent color bands and is used to perform interpolation at later steps of optimization. The purpose of the transition region 603 is to provide a smooth transition between the two adjacent color bands. Referring to the example in FIG. 9, the transition region identifier 140 identifies 25% of the first color band 601 with grayscale N (line 7 and 8) as a region with grayscale N+0.5 (line DR1 and DR2). Similarly, 25% of the second color band 602 with grayscale N+1 (line 1 and 2) is also identified as a region with grayscale N+0.5 (line DR3 and DR4). The new grayscale N+0.5 region (line DR1 to DR4) is the transition region 603 between the two adjacent color bands.

In certain embodiments, there are two steps for identifying a transition region 603. In the first step, the transition region identifier 140 determines sizes of the two adjacent color bands: 601 and 602. In the second step, the transition region identifier 140 identifies a predefined percentage of the two adjacent color bands abutting each other along the longitudinal direction as the transition region 603. By the experience of the Inventors, the predefined percentage is typically 25%, but may vary depending on the size of the color band and the characteristics of the panel. The RGB color components of the transition region 603 are interpolated from the RGB color components of the first color band 601 and the second color band 602. This is substantially the same effect as a display driver 100 with 1 extra bit of resolutions for each of the color components, corresponding to 1 extra grayscale level between the grayscale N and grayscale N+1.

Figure 8:
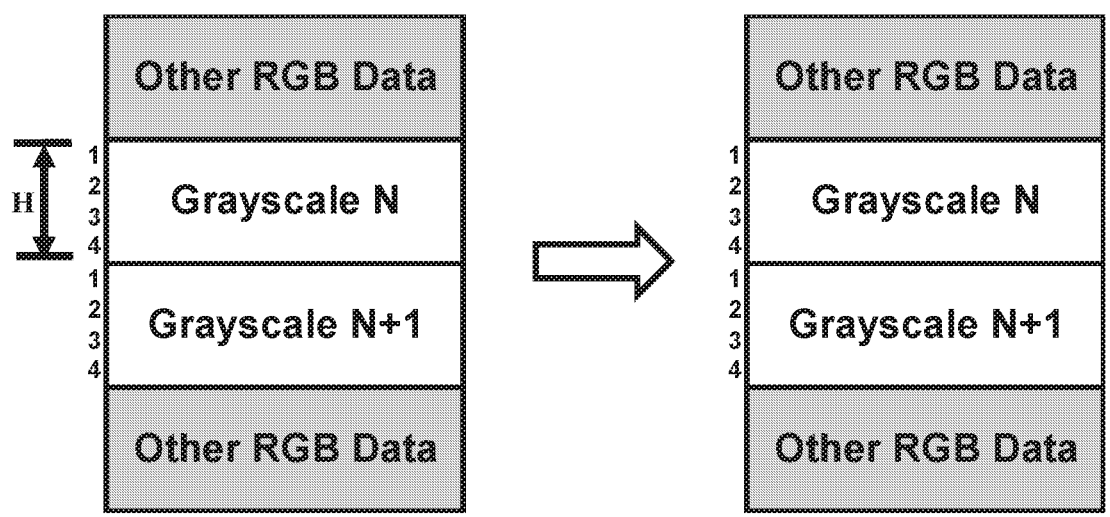
FIG. 8 depicts a conceptual diagram describing an embodiment of the edge boost compensating method when color band height (H) is too small (H<=4).
Figure 11:
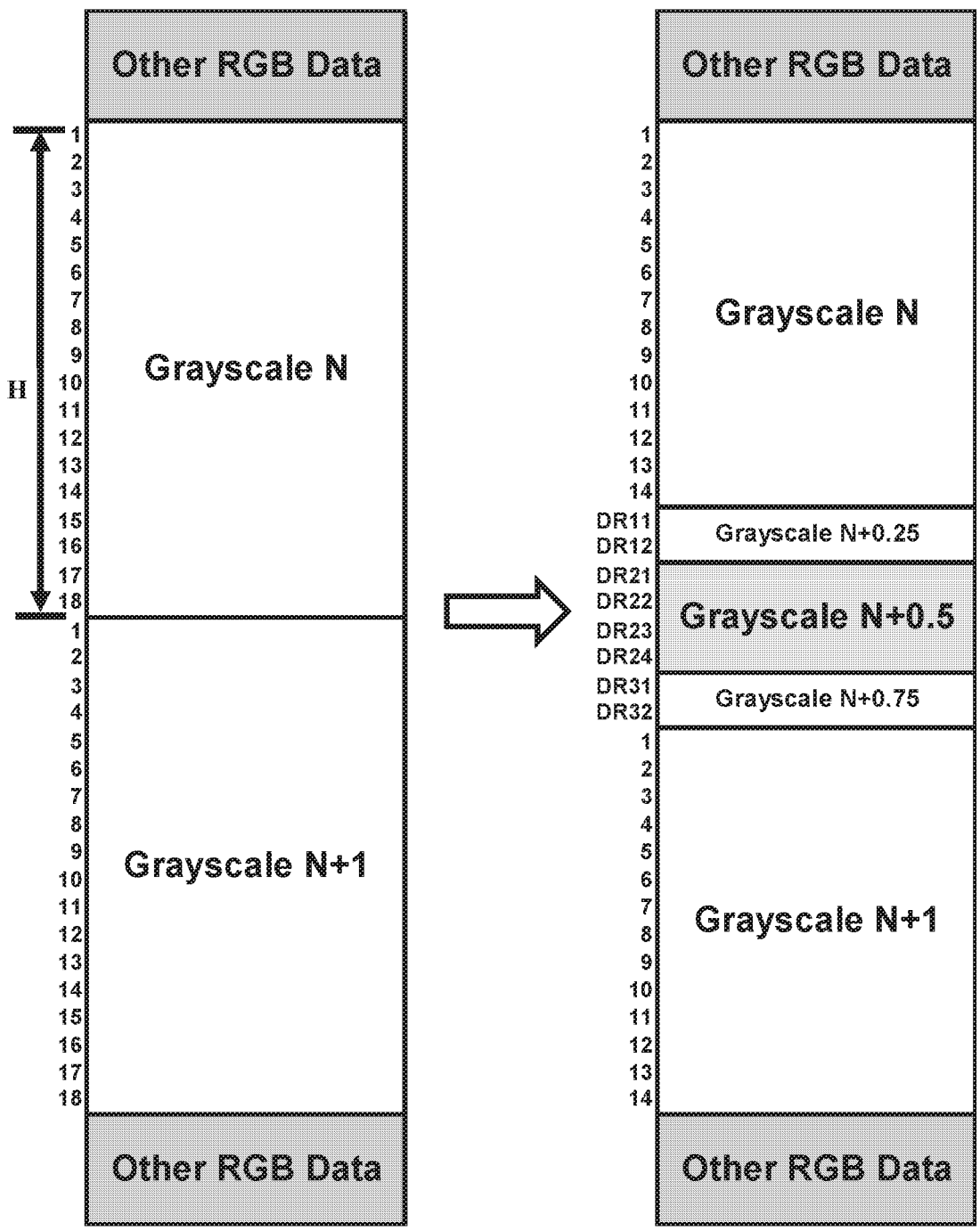
FIG. 11 depicts a conceptual diagram describing an embodiment of the edge boost compensating method when H>16.

In some cases when the size of the color band is too small, it is not preferable to perform any optimization at the boundary of the color band as it may not proportionately segment a transition region (for example, less than or equal to 4 lines in height as in FIG. 8). On the other hand, if the size of the color band is too large, a smaller percentage of the color band is identified as the transition region such that the transition region is not more than a predefined number of lines along the longitudinal direction (for example. more than 16 lines in height as in FIG. 11).

Figure 12:
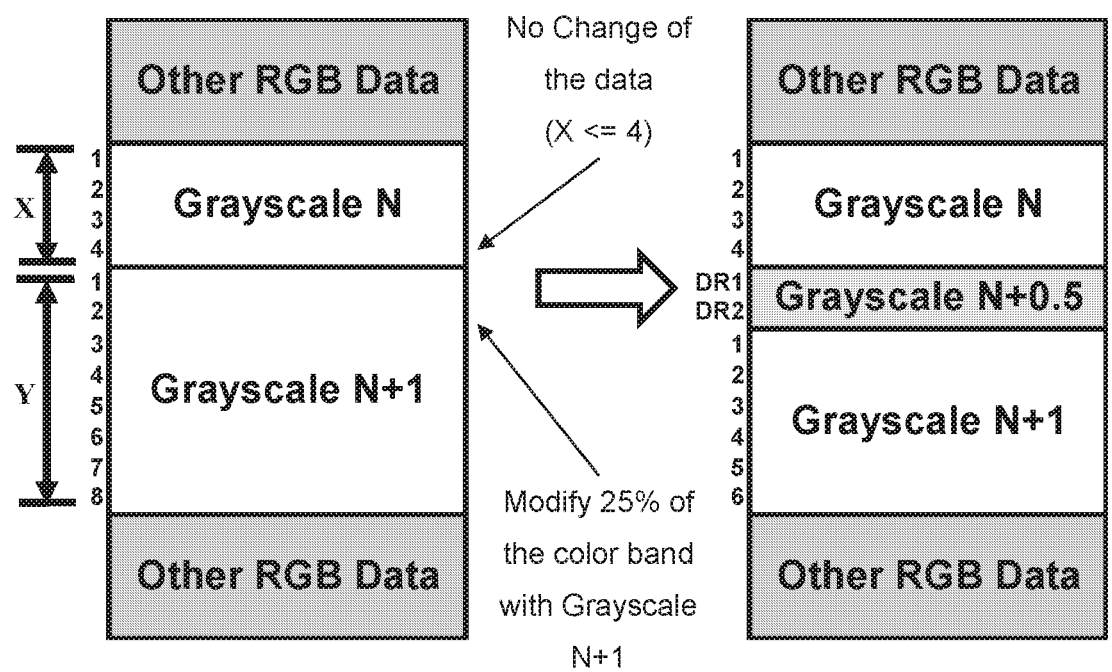
FIGS. 12, 13 and 14 are conceptual diagrams describing an embodiment of the edge boost compensating method when the heights of the two color bands are different.
Figure 13:
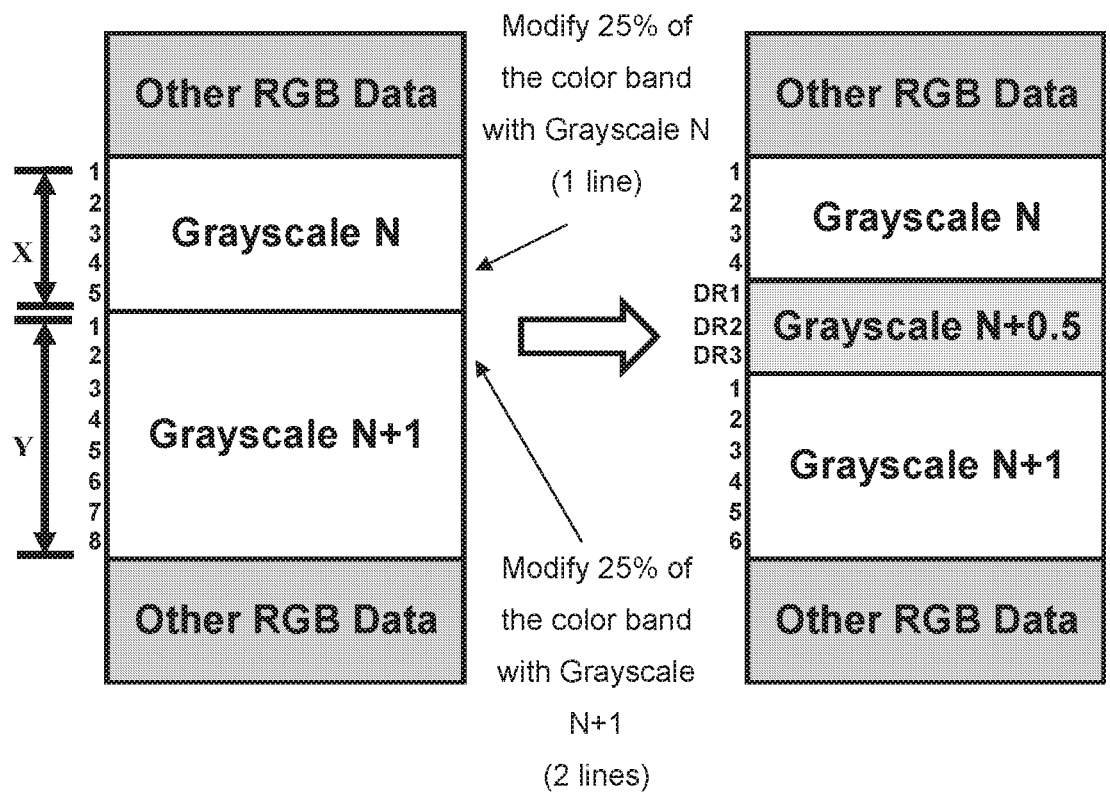

FIGS. 12 and 13 depict the identification of a transition region when the heights of the first color band and second color band are different.

Referring to FIG. 5 where the edges 504 and 505 are identified by the edge boost effect detector 130 between the three color bands 501, 502 and 503, the transition region identifier 140 can identify the transition regions 506 and 507 accordingly. If the first color bands 501 and second color band 502 are not too small, a predefined percentage of the first color band 501 abutting to the second color band 502 along the longitudinal direction is identified as an identified region. Similarly, a predefined percentage of the second color band 502 abutting to the first color band 501 along the longitudinal direction is also identified as another identified region. The above two identified regions are combined together to form a transition region 506 between the two color bands 501 and 502.

Figure 10:
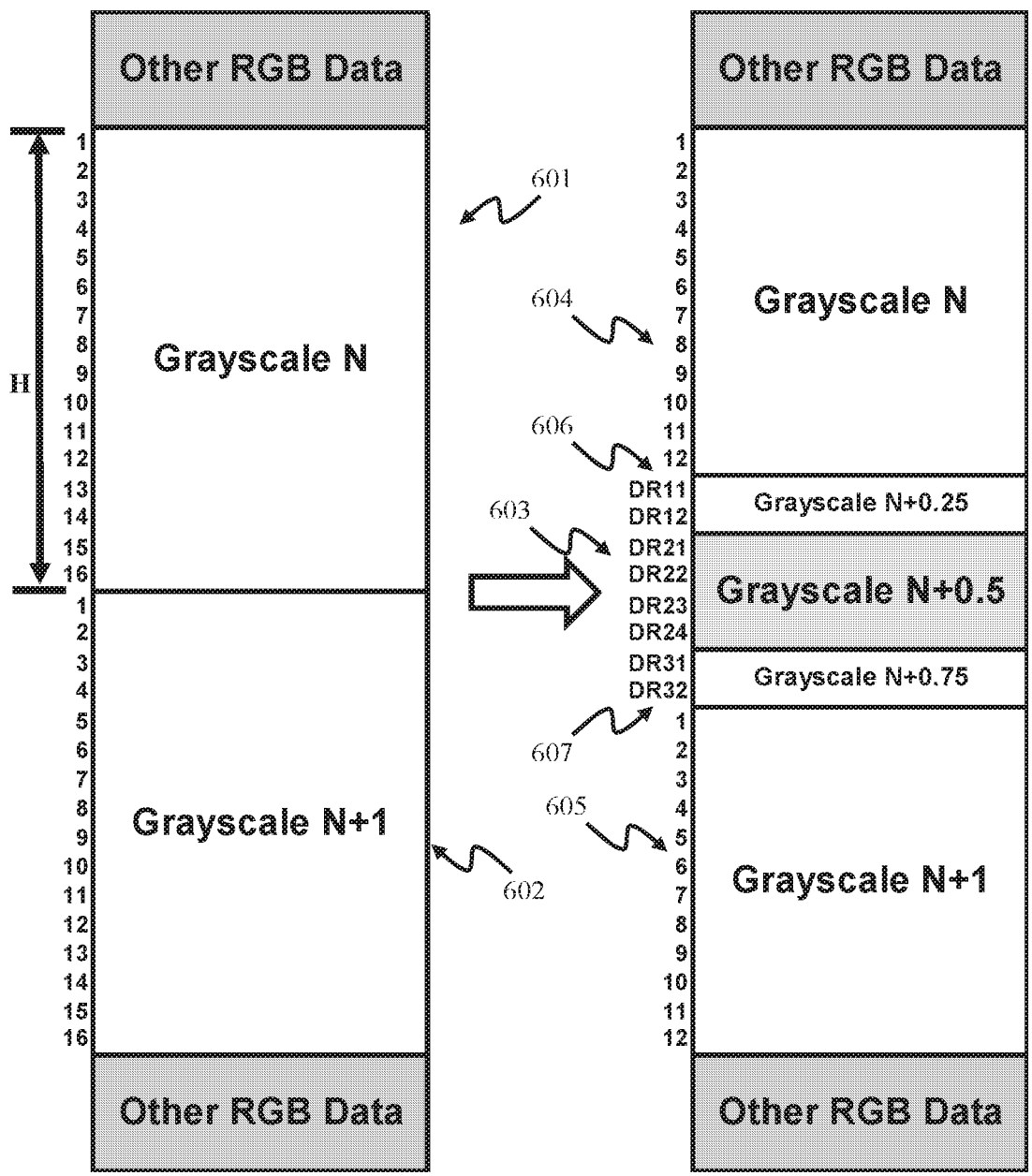
FIG. 10 depicts a conceptual diagram describing an embodiment of the edge boost compensating method when 8<H<=16.

In accordance with one implementation, the transition region identifier 140 can also identify one or more intermediate transition regions 606 and 607) from the transition region 603 when either one or both of the two adjacent color bands have a size more than a predefined number of lines along the longitudinal direction. This embodiment is demonstrated by the example in FIG. 10. The purpose of the intermediate transition regions (606 and 607) is to provide a smoother transition between the two adjacent color bands (601 and 602). In the intermediate transition region as identified from first color band 606, at least one of the RGB color components is interpolated from the RGB color components of the transition region 603 and the first color band 601, wherein the RGB color components of the transition region 603 is interpolated from the RGB color components of the first color band 601 and the second color band 602. Upon optimization, the transition from first color band 604 to the second color band 605 is smoothened by identifying an intermediate transition region 606 with gray scale N+0.25, a transition region 603 with gray scale N+0.5 and an intermediate transition region 607 with grayscale N+0.75. With the above implementation, this is substantially the same effect as a display driver 100 with 2 extra bits of resolutions for each of the color components, corresponding to 3 extra grayscale levels between the grayscale N and grayscale N+1.

Figure 14:
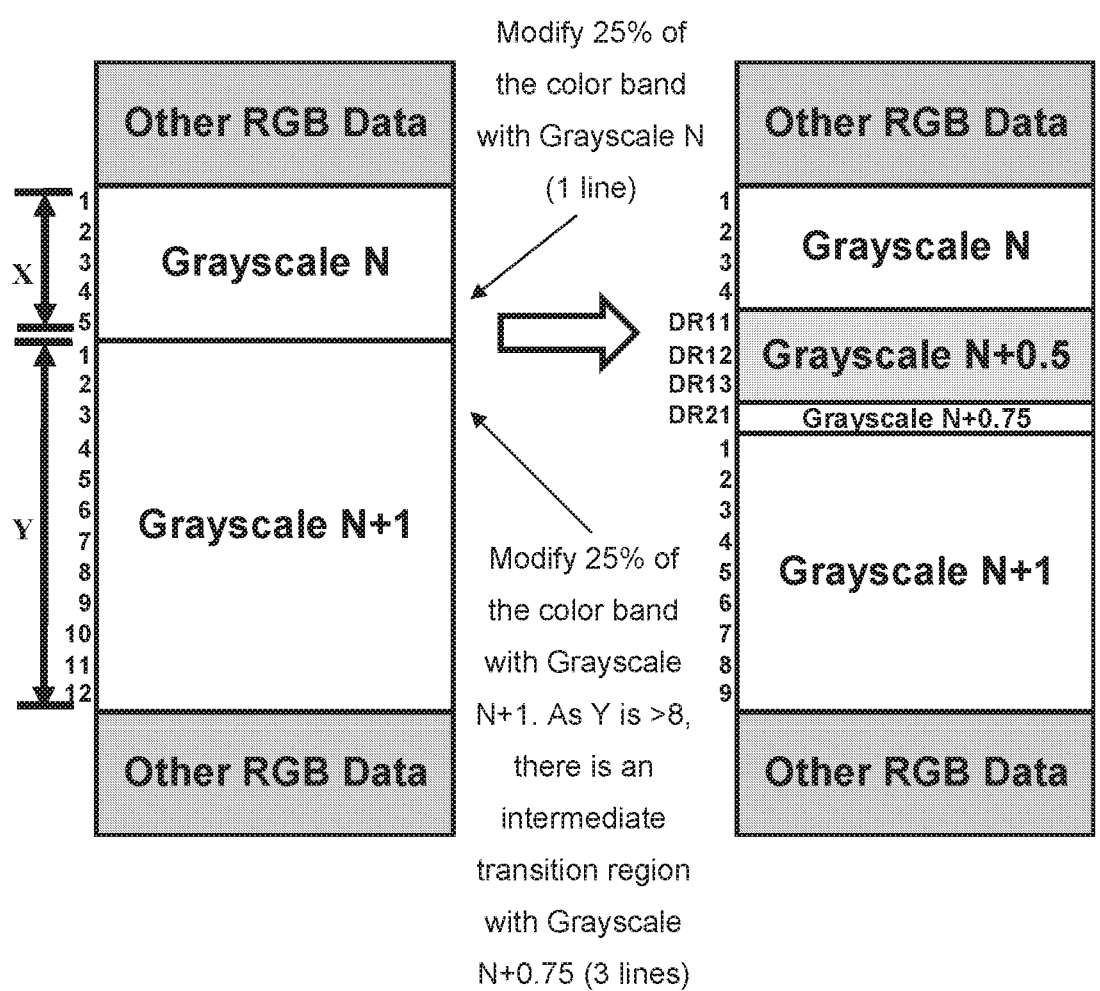

FIG. 14 depicts the identification of an intermediate transition region when the heights of the first color band and second color band are different.

After all the transition regions are identified S250, further optimization is performed on each of the transition regions according to the grayscale value by color dilution S260, to perform transition region optimization to form a modified image for display. If there is a transition region with a grayscale value of N+0.5 is identified, the color dilution S260 will be based on the interpolation between the two adjacent color bands to achieve the grayscale value of N+0.5. The transitional grayscale level of N+0.5 between the two adjacent color bands provides a smooth switching of color at the boundary such that the perceptual bias of edge boost can be compensated. It will be apparent to those skilled in the art that modifications, including using other optimization methods based on the interpolation between the two adjacent color bands, may be made without departing from the scope and spirit of the invention.

Figure 17:
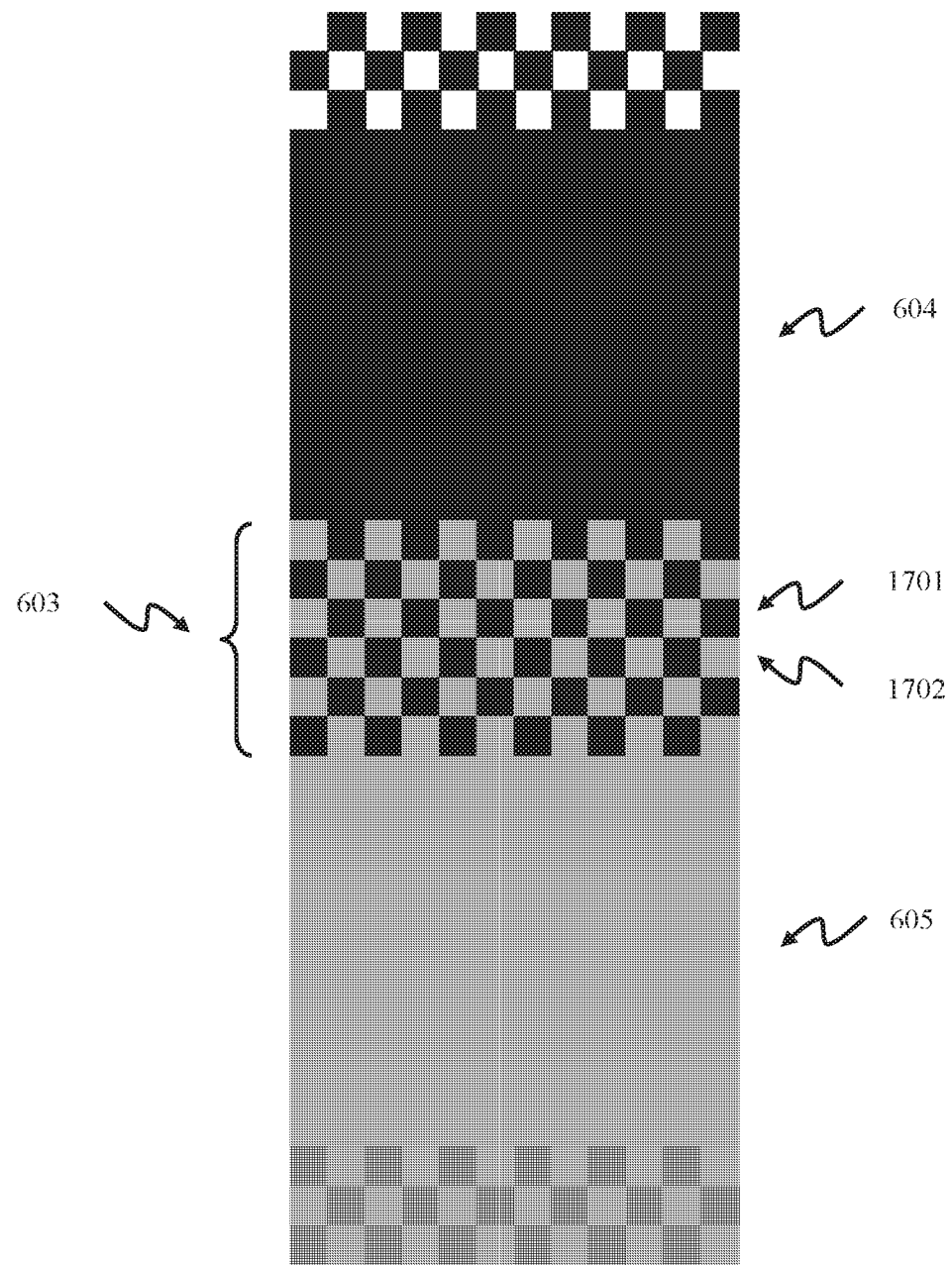
FIG. 17 depicts a conceptual drawing describing the spatial-domain interpolation of two adjacent color bands.

The approach to using color dilution S260 on the transition region 603 is implemented by a color dilution unit 150 in the display driver 100. The color dilution can be performed by a spatial-domain interpolation, a time-domain interpolation, or both. The example in FIG. 17 illustrates the spatial-domain interpolation. The spatial-domain interpolation is performed by modifying the RGB color components of the pixel data based on the interpolation between the two adjacent color bands. At the transition region 603, the pixel data therein are modified such that some of the pixel data have the same color component as the first color band 604 (the color is indicated as 1701), and some of the pixel data have the same color component as the second color band 605 (the color is indicated as 1702). The pixel data of the two color components are blended both laterally and longitudinally, in an evenly manner, in the transition region 603.

Figure 18:
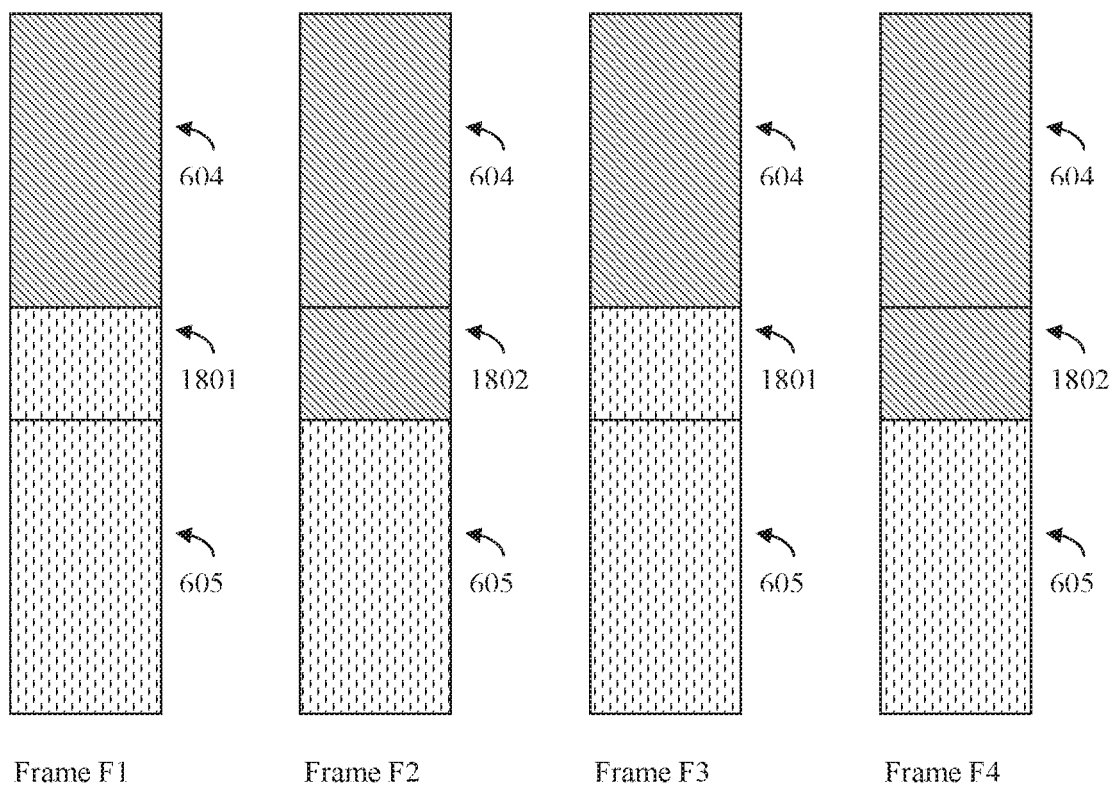
FIG. 18 depicts a conceptual drawing describing the time-domain interpolation of two adjacent color bands.

An alternative approach to using a time-domain interpolation on the transition region 603 is implemented by controlling the frame rate in the display driver 100, with reference to the example in FIG. 18. The time-domain interpolation is performed by modifying the RGB color components of the pixel data. in the transition region 603 to the RGB color components of the pixel data in the second color band 605 (the color is indicated as 1801) during a plurality of selected frames; and modifying the RGB color components of the pixel data in the transition region 603 to the RGB color components of the pixel data in the first color band 604 (the color is indicated as 1802) during a plurality of non-selected frames. Therefore, the pixel data in the transition region is changing periodically and has a set of time-varying dynamic RGB color components. The time-domain interpolation is characterized by a predefined frame frequency for switching between the selected frames and the non-selected frames, which are identified according to the interpolation between the two adjacent color bands. The frequency for the switching is carefully selected to avoid any image flickering.

Referring to the example in FIG. 18, the transition region has a pixel data corresponding to the first color band 604 in frame F1, a pixel data corresponding to the second color band 605 in frame F2, a pixel data corresponding to the first color band 604 in frame F3 and a pixel data corresponding to the second color band 605 in frame F4. The above example of the time-domain interpolation has substantially the same effect as an interpolation between first color band 601 with grayscale N and second color band 602 with grayscale N+1 to form grayscale N+0.5.

In certain embodiments, the spatial-domain interpolation and the time-domain interpolation may be used simultaneously or alternatively to provide an optimized effect to the color dilution.

Figure 4:
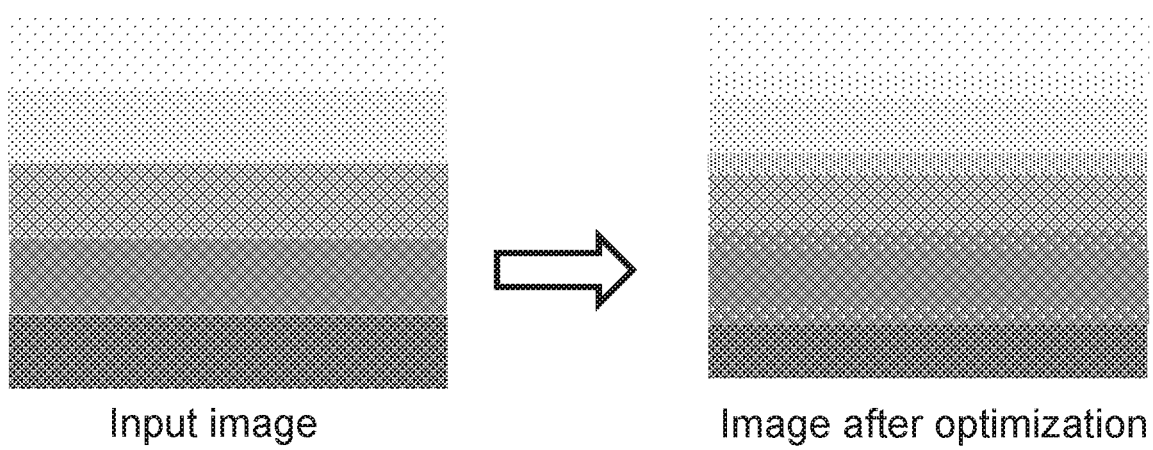
FIG. 4 is a comparison between an input image with grayscale regions and the image displayed on a display panel after optimization, served as an example.

The output buffer 160 is configured to store the modified image for generating a plurality of control signals S280 for driving the display panel 170. The output buffer 160 can, by converting the processed RGB (R'G'B') components of the pixel data into analog signals, generate control signals via a plurality of output terminals thereof. The control signals may include, but are not limited to high voltage gate control signals, gate in panel (GIP) control signals, source control signals and common voltage (VCOM) signal. FIG. 4 depicts an exemplary input image and the displayed image on display panel 170 after optimization according to the present invention.

In certain embodiments, luminance intensity is used instead of grayscale level in the present disclosure of a method for pre-processing an input image with a plurality of pixel data to compensate for a perceptual bias of edge boost at a contiguous group of color bands in the input image prior to sending the input image in a form of plural frames to a display panel for display.

The grayscale detector 120 can identify a contiguous group of color bands in the two-dimensional matrix with continuous and gradual changes of the luminance intensity. The gradual change is characterized by a subtle but perceivably significant change of a predefined percentage of the maximum luminance intensity. By applying the equation (1), the luminance intensity of the rows of pixel data can be determined. As an exemplary case, a grayscale region might have the first four rows with pixel data of (255, 128, 128), next four rows with pixel data of (255, 127, 127) and last four rows with pixel data of (255, 126, 126). The luminance intensity of the pixel data in each group is:

TABLE 1

|  | Red | Green | Blue | Luminance |
| --- | --- | --- | --- | --- |
| Row 0-3 | 255 | 128 | 128 | 159.75 |
| Row 4-7 | 255 | 127 | 127 | 159 |
| Row 8-11 | 255 | 126 | 126 | 158.25 |

In the above case, each four rows of pixel data have the same luminance laterally and together form a color band. Therefore it is apparent that the pixel data of the first color band in the contiguous group of color bands has the same luminance intensity and different from the luminance intensity of the pixel data in the second color band by the perceivably significant luminance change.

The edge boost effect detector 130 can detect a perceivably significant luminance change by at most a predefined number of luminance levels between two adjacent color bands in the contiguous group of color bands, wherein the two adjacent color bands comprise a first color band and a second color band abutting each other. From the experiments performed by the Inventors, the number of luminance levels is not more than 1% of the maximum luminance intensity as estimated using equation (1) or other similar equations with the same effect.

The transition region identifier 140 can identify a transition region 603 between the two adjacent color bands S250 where the perceivably significant luminance change is detected S240 by the edge boost effect detector 130. The transition region 603 can be formed at the edge 608 between the first color band 601 and the second color band 602, and a new grayscale level for the pixel data therein can be indicated accordingly. The new grayscale level is estimated based on the luminance of the two adjacent color bands and is used to perform interpolation at later steps of optimization.

In certain embodiments, there are two steps for identifying a transition region 603. At the first step, the transition region identifier 140 determines sizes of the two adjacent color bands: 601 and 602. At the second step, the transition region identifier 140 identifies a predefined percentage of the two adjacent color bands abutting each other along the longitudinal direction as the transition region 603. The luminance intensity of the transition region 603 is interpolated from the luminance intensities of the first color band 601 and the second color band 602. This is substantially the same effect as a display driver 100 with 1 extra bit of resolutions for each of the color components, corresponding to 1 extra grayscale level between the grayscale N and grayscale N+1. The size of the identified transition region is determined such that the transition region is not more than a predefined number of lines along the longitudinal direction.

In certain embodiments, the transition region identifier 140 can also identify one or more intermediate transition regions (606 and 607) from the transition region 603 when either one or both of the two adjacent color bands have a size more than a predefined number of lines along the longitudinal direction. The luminance intensity of the intermediate transition region (606 and 607) is interpolated from the luminance intensities of the transition region 603 and the first color band 601, wherein the luminance intensity of the transition region 603 is interpolated from the luminance intensities of the first color band 601 and the second color band 602. With the above implementation, this is substantially the same effect as a display driver 100 with 2 extra bits of resolutions for each of the color components, corresponding to 3 extra grayscale levels between the grayscale N and grayscale N+1.

After all the transition regions are identified S250, further optimization can be performed on each of the transition regions according to the luminance intensity by color dilution S260 to form a modified image for display. The color dilution S260 can be performed by a spatial-domain interpolation, a time-domain interpolation, or both. The spatial-domain interpolation can be performed by modifying the luminance intensity of the pixel data based on the interpolation between the two adjacent color bands. The time-domain interpolation can be performed by modifying the luminance intensity of the pixel data in the transition region 603 to the luminance intensity of the pixel data in the second color band 605 (the color is indicated as 1801) during a plurality of selected frames; and modifying the luminance intensity of the pixel data in the transition region 603 to the luminance intensity of the pixel data in the first color band 604 (the color is indicated as 1802) during a plurality of non-selected frames. The pixel data in the transition region has a set of time-varying dynamic RGB color components. The selected frames and non-selected frames are identified according to the interpolation between the two adjacent color bands.

It will be apparent to those skilled in the art that various modifications and variations can be made to the structure of the present invention without departing from the scope or spirit of the invention. In view of the foregoing descriptions, it is intended that the invention covers modifications and variations of this invention if they fall within the scope of the following claims and their equivalents.

What is claimed is:

1. A method for pre-processing an input image with a plurality of pixel data to compensate for a perceptual bias of edge boost at a contiguous group of color bands in the input image prior to sending the input image to a display panel for display, wherein the contiguous group of color bands varies in color along a longitudinal direction gradually from one end to another end, the method comprising the steps of:
    detecting a perceivably significant color change by at most a predefined number of grayscale levels in at least one of the RGB color components between two adjacent color bands in the contiguous group of color bands, wherein the two adjacent color bands comprise a first color band and a second color band abutting each other;
    identifying a transition region between the two adjacent color bands where the perceivably significant color change is detected; and
    performing color dilution at the transition region to form a modified image based on interpolation so that the perceptual bias of edge boost is compensated, wherein at least one of the RGB color components of the transition region is interpolated from the RGB color components of the two adjacent color bands;
    wherein the step of identifying the transition region between the two adjacent color bands comprises determining sizes of the two adjacent color bands and identifying a predefined percentage of the two adjacent color bands abutting each other along the longitudinal direction as the transition region.

2. The method of claim 1, further comprising the step of identifying the contiguous group of color bands in the input image with continuous and gradual changes of at least one of the RGB color components.

3. The method of claim 1, wherein the pixel data of the first color band in the contiguous group of color bands has the same RGB color components and different from the RGB color components of the pixel data in the second color band by the perceivably significant color change.

4. The method of claim 1, wherein a size of the identified transition region is determined such that the transition region is not more than a predefined number of lines along the longitudinal direction.

5. The method of claim 1 further comprising the step of identifying one or more intermediate transition regions from the transition region when either one or both of the two adjacent color bands have a size more than a predefined number of lines along the longitudinal direction.

6. The method of claim 1, wherein color dilution is performed by a spatial-domain interpolation, a time-domain interpolation, or both.

7. The method of claim 6, wherein the spatial-domain interpolation is performed by modifying the RGB color components of the pixel data based on the interpolation.

8. A method for pre-processing an input image with a plurality of pixel data to compensate for a perceptual bias of edge boost at a contiguous group of color bands in the input image prior to sending the input image to a display panel for display, wherein each of the contiguous group of color bands varies in a luminance intensity along a longitudinal direction gradually from one end to another end, the method comprising the steps of:
    detecting a perceivably significant luminance change by at most a predefined number of luminance levels between two adjacent color bands in the contiguous group of color bands, wherein the two adjacent color bands comprises a first color band and a second color band abutting each other;
    identifying a transition region between the two adjacent color bands where the perceivably significant luminance change is detected; and
    performing color dilution at the transition region to form a modified image based on interpolation so that the perceptual bias of edge boost is compensated, wherein the luminance intensity of the transition region is interpolated from the luminance intensity of the two adjacent color bands;
    wherein the step of identifying the transition region between the two adjacent color bands comprises determining sizes of the two adjacent color bands and identifying a predefined percentage of the two adjacent color bands abutting each other along the longitudinal direction as the transition region.

9. The method of claim 8, wherein the luminance intensity of the pixel data is determined by separating the color components of the pixel data into three primary colors; and processing a summation of predefined percentages of the three primary colors of the pixel data.

10. The method of claim 8, further comprising the step of identifying the contiguous group of color bands in the input image with continuous and gradual changes of the luminance intensity.

11. The method of claim 8, wherein the pixel data of the first color band in the contiguous group of color bands has the same luminance intensity and different from the luminance intensity of the pixel data in the second color band by the perceivably significant luminance change.

12. The method of claim 8, wherein a size of the identified transition region is determined such that the transition region is not more than a predefined number of lines along the longitudinal direction.

13. The method of claim 8 further comprising the step of identifying one or more intermediate transition regions from the transition region when either one or both of the two adjacent color bands have a size more than a predefined number of lines along the longitudinal direction.

14. The method of claim 8, wherein color dilution is performed by a spatial-domain interpolation, a time-domain interpolation, or both.

15. The method of claim 14, wherein the spatial-domain interpolation is performed by modifying the luminance intensity of the pixel data based on the interpolation.

16. A display driver, comprising:
an input buffer configured to receive an input image to be displayed on a display panel;
an image processor configured to execute a process of processing the input image and compensating the perceptual bias of edge boost therein according to the method of claim 1; and
an output buffer configured to store the modified image for generating a plurality of control signals for driving the display panel.

17. A display driver, comprising:
an input buffer configured to receive an input image to be displayed on a display panel;
an image processor configured to execute a process of processing the input image and compensating the perceptual bias of edge boost therein according to the method of claim 8; and
an output buffer configured to store the modified image for generating a plurality of control signals for driving the display panel.

18. A method for pre-processing an input image with a plurality of pixel data to compensate for a perceptual bias of edge boost at a contiguous group of color bands in the input image prior to sending the input image to a display panel for display, wherein the contiguous group of color bands varies in color along a longitudinal direction gradually from one end to another end, the method comprising the steps of:
detecting a perceivably significant color change by at most a predefined number of grayscale levels in at least one of the RGB color components between two adjacent color bands in the contiguous group of color bands, wherein the two adjacent color bands comprise a first color band and a second color band abutting each other;
identifying a transition region between the two adjacent color bands where the perceivably significant color change is detected; and
performing color dilution, by a spatial-domain interpolation, a time-domain interpolation, or both, at the transition region to form a modified image based on interpolation so that the perceptual bias of edge boost is compensated, wherein at least one of the RGB color components of the transition region is interpolated from the RGB color components of the two adjacent color bands;
wherein:
the time-domain interpolation is performed by:
modifying the RGB color components of the pixel data in the transition region to the RGB color components of the pixel data in the second color band during a plurality of selected frames; and
modifying the RGB color components of the pixel data in the transition region to the RGB color components of the pixel data in the first color band during a plurality of non-selected frames;
the pixel data in the transition region has a set of time-varying dynamic RGB color components; and
the selected frames and non-selected frames are identified according to the interpolation between the two adjacent color bands.

19. A display driver, comprising:
an input buffer configured to receive an input image to be displayed on a display panel;
an image processor configured to execute a process of processing the input image and compensating the perceptual bias of edge boost therein according to the method of claim 18; and
an output buffer configured to store the modified image for generating a plurality of control signals for driving the display panel.

20. A method for pre-processing an input image with a plurality of pixel data to compensate for a perceptual bias of edge boost at a contiguous group of color bands in the input image prior to sending the input image to a display panel for display, wherein each of the contiguous group of color bands varies in a luminance intensity along a longitudinal direction gradually from one end to another end, the method comprising the steps of:
detecting a perceivably significant luminance change by at most a predefined number of luminance levels between two adjacent color bands in the contiguous group of color bands, wherein the two adjacent color bands comprises a first color band and a second color band abutting each other;
identifying a transition region between the two adjacent color bands where the perceivably significant luminance change is detected; and
performing color dilution, by a spatial-domain interpolation, a time-domain interpolation, or both, at the transition region to form a modified image based on interpolation so that the perceptual bias of edge boost is compensated, wherein the luminance intensity of the transition region is interpolated from the luminance intensity of the two adjacent color bands;
wherein:
the time-domain interpolation is performed by:
modifying the luminance intensity of the pixel data in the transition region to the luminance intensity of the pixel data in the second color band during a plurality of selected frames; and
modifying the luminance intensity of the pixel data in the transition region to the luminance intensity of the pixel data in the first color band during a plurality of non-selected frames;
the pixel data in the transition region has a set of time-varying dynamic RGB color components; and
the selected frames and non-selected frames are identified according to the interpolation between the two adjacent color bands.

21. A display driver, comprising:
an input buffer configured to receive an input image to be displayed on a display panel;
an image processor configured to execute a process of processing the input image and compensating the perceptual bias of edge boost therein according to the method of claim 20; and
an output buffer configured to store the modified image for generating a plurality of control signals for driving the display panel.

* * * * *